United States Patent
Li et al.

(10) Patent No.: US 11,274,058 B2
(45) Date of Patent: Mar. 15, 2022

(54) CRYSTALLIZED GLASS AND CHEMICALLY STRENGTHENED GLASS

(71) Applicant: AGC Inc., Chiyoda-ku (JP)

(72) Inventors: Qing Li, Tokyo (JP); Akio Koike, Tokyo (JP); Kazuki Kanehara, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/747,586

(22) Filed: Jan. 21, 2020

(65) Prior Publication Data

US 2020/0239354 A1     Jul. 30, 2020

Related U.S. Application Data

(63) Continuation of application No. PCT/JP2018/027578, filed on Jul. 23, 2018.

(30) Foreign Application Priority Data

Jul. 26, 2017   (JP) .............................. JP2017-144868
Jan. 10, 2018   (JP) .............................. JP2018-002200
Mar. 9, 2018   (JP) .............................. JP2018-043494

(51) Int. Cl.
    *C03C 10/00*       (2006.01)
    *C03C 3/097*       (2006.01)
                   (Continued)

(52) U.S. Cl.
    CPC .............. *C03C 3/097* (2013.01); *C03B 32/02* (2013.01); *C03C 3/083* (2013.01); *C03C 21/002* (2013.01)

(58) Field of Classification Search
    CPC ................................ C03C 3/097; C03C 3/083
                   (Continued)

(56) References Cited

U.S. PATENT DOCUMENTS

| 4,074,392 A | 2/1978 | Voss |
| 4,074,993 A | 2/1978 | Ackerman et al. |

(Continued)

FOREIGN PATENT DOCUMENTS

| JP | 61-101434 A | 5/1986 |
| JP | 64-52631 A | 2/1989 |

(Continued)

OTHER PUBLICATIONS

JP-2001348250-A translation, Matano, 2001.*

(Continued)

*Primary Examiner* — Lauren R Colgan
(74) *Attorney, Agent, or Firm* — Oblon, McClelland, Maier & Neustadt, L.L.P.

(57) ABSTRACT

A crystallized glass that: has a visible light transmittance of at least 85% when the thickness thereof is converted to 0.8 mm; has a haze value of no more than 1.0% when the thickness thereof is converted to 0.8 mm; contains, in terms of mass % on an oxide basis, 58%-70% $SiO_2$, 15%-30% $Al_2O_3$, 2%-10% $Li_2O$, 0%-5% $Na_2O$, 0%-2% $K_2O$, 0%-1.8% SrO, 0%-2% BaO, 0.5%-6% $SnO_2$, 0.5%-6% $ZrO_2$, and 0%-6% $P_2O_5$; has a total SrO and BaO content of 0.1%-3%; and has a total $Na_2O$ and $K_2O$ content of 1%-5%.

2 Claims, 4 Drawing Sheets (51) Int. Cl.
*C03B 32/02* (2006.01)
*C03C 3/083* (2006.01)
*C03C 21/00* (2006.01)

(58) Field of Classification Search
USPC ........................................................ 428/426
See application file for complete search history.

(56) References Cited

U.S. PATENT DOCUMENTS

| | | | |
|---|---|---|---|
| 4,438,210 A | | 3/1984 | Rittler |
| 4,755,488 A | | 7/1988 | Nagashima |
| 6,472,338 B1 | * | 10/2002 | Shimatani ............... C03C 1/004 501/4 |
| 2005/0090377 A1 | | 4/2005 | Shelestak et al. |
| 2009/0263662 A1 | | 10/2009 | Shelestak et al. |
| 2010/0167903 A1 | * | 7/2010 | Comte ................... C03C 3/093 501/27 |
| 2010/0233407 A1 | | 9/2010 | Shelestak et al. |
| 2011/0071011 A1 | * | 3/2011 | Fujisawa ............... C03C 3/085 501/69 |
| 2011/0079048 A1 | | 4/2011 | Shelestak et al. |
| 2014/0134397 A1 | | 5/2014 | Amin et al. |
| 2014/0238971 A1 | | 8/2014 | Comte et al. |
| 2014/0357468 A1 | * | 12/2014 | Siebers ............... C03C 10/0009 501/32 |
| 2015/0274581 A1 | | 10/2015 | Beall et al. |
| 2016/0122240 A1 | | 5/2016 | Oram et al. |
| 2016/0280589 A1 | | 9/2016 | Beall et al. |
| 2017/0334767 A1 | | 11/2017 | Beall et al. |

FOREIGN PATENT DOCUMENTS

| | | |
|---|---|---|
| JP | 3-23237 A | 1/1991 |
| JP | 6-096460 | 11/1994 |
| JP | 2001-316132 A | 11/2001 |
| JP | 2001-348250 A | 12/2001 |
| JP | 2002-154840 A | 5/2002 |
| JP | 2007-527354 A | 9/2007 |
| JP | 2016-529201 A | 9/2016 |
| WO | WO 2016/154235 A1 | 9/2016 |

OTHER PUBLICATIONS

JP2002154840 translation, Fujita 2002.*
International Search Report dated Sep. 11, 2018, in PCT/JP2018/027578, 5 pages (with English translation).
Written Opinion dated Sep. 11, 2018, in PCT/JP2018/027578, 4 pages.
U.S. Appl. No. 16/747,584, filed Jan. 21, 2020.
U.S. Appl. No. 16/747,593, filed Jan. 21, 2020.
George H. Beall, et al., "Ion-Exchange in Glass-Ceramics", *Front. Mater.*, vol. 3, Article 41, (Aug. 23, 2016) pp. 1-11.

* cited by examiner

CRYSTALLIZED GLASS AND CHEMICALLY STRENGTHENED GLASS

TECHNICAL FIELD

The present invention relates to a crystallized glass and a chemically strengthened glass.

BACKGROUND ART

A chemically strengthened glass is used as a cover glass of a portable terminal or the like.

The chemically strengthened glass is, for example, a glass which has been brought into contact with molten salt containing alkali metal ions to cause ion exchange between alkali metal ions in the glass and the alkali metal ions in the molten salt to thereby form a compressive stress layer in a surface of the glass.

A crystallized glass is a glass in which crystals have been precipitated. In comparison with an amorphous glass containing no crystals, the crystallized glass is hard enough not to be easily scratched. Patent Literature 1 describes an example in which a crystallized glass is chemically strengthened by an ion exchange treatment. However, the crystallized glass is no match for the amorphous glass in terms of transparency.

Patent Literature 2 describes a transparent crystallized glass.

CITATION LIST

Patent Literature

Patent Literature 1: JP-T-2016-529201
Patent Literature 2: JP-A-S64-52631

SUMMARY OF INVENTION

Technical Problem

However, few transparent crystallized glasses have transparency high enough to be suited to cover glasses. In addition, the crystallized glass described in Patent Literature 2 has not been chemically strengthened. Therefore, the crystallized glass of Patent Literature 2 is insufficient in strength as a cover glass.

The chemical strengthening characteristics of a crystallized glass are strongly influenced by the composition of the glass or crystals precipitated therein. The scratch resistance or the transparency of the crystallized glass is also strongly influenced by the glass composition or the precipitated crystals. Therefore, in order to obtain a crystallized glass excellent in both the chemical strengthening characteristics and the transparency, it is necessary to finely control the glass composition and the precipitated crystals.

The present invention provides a crystallized glass which is excellent in transparency and chemical strengthening characteristics. In addition, the present invention provides a chemically strengthened glass which is excellent in transparency and strength and is hardly scratched.

Solution to Problem

The present invention provides a crystallized glass, having:
a visible light transmittance of 85% or higher in terms of a thickness of 0.8 mm; and
a haze value of 1.0% or lower in terms of the thickness of 0.8 mm, and
including, as expressed by mass % on an oxide basis:
58 to 70% of $SiO_2$;
15 to 30% of $Al_2O_3$;
2 to 10% of $Li_2O$;
0 to 5% of $Na_2O$;
0 to 2% of $K_2O$;
0 to 1.8% of SrO;
0 to 2% of BaO;
0.5 to 6% of $SnO_2$;
0.5 to 6% of $ZrO_2$; and
0 to 6% of $P_2O_5$,
in which a total content of SrO and BaO is 0.1 to 3%, and a total content of $Na_2O$ and $K_2O$ is 1 to 5%.

In addition, the present invention provides a chemically strengthened glass having a compressive stress layer in a surface thereof, having:
a visible light transmittance of 85% or higher in terms of a thickness of 0.8 mm and a haze value of 1.0% or lower in terms of the thickness of 0.8 mm; and
a surface compressive stress of 600 MPa or more and a depth of the compressive stress layer of 80 μm or more, and
being a crystallized glass including, as expressed by mass % on an oxide basis:
58 to 70% of $SiO_2$;
15 to 30% of $Al_2O_3$;
2 to 10% of $Li_2O$;
0 to 5% of $Na_2O$;
0 to 2% of $K_2O$;
0 to 1.8% of SrO;
0 to 2% of BaO;
0.5 to 6% of $SnO_2$;
0.5 to 6% of $ZrO_2$; and
0 to 6% of $P_2O_5$,
in which a total content of SrO and BaO is 0.1 to 3%, and a total content of $Na_2O$ and $K_2O$ is 1 to 5%.

Advantageous Effects of Invention

According to the present invention, it is possible to obtain a crystallized glass which is excellent in transparency and chemical strengthening characteristics. In addition, it is possible to obtain a chemically strengthened glass which is excellent in transparency and mechanical strength and is hardly scratched.

DESCRIPTION OF EMBODIMENTS

The word "to" designating a numerical range in the present description is used as a denotation of a range including numerical values on both sides thereof as a lower limit value and an upper limit value of the range.

The word "glass" in the present description designates an "amorphous glass" and a "crystallized glass" collectively. The "amorphous glass" in the present description designates a glass in which a diffraction peak indicating a crystal cannot be recognized by a powder X-ray diffraction method. The "crystallized glass" is obtained by heating the "amorphous glass" to precipitate a crystal therein. The "crystallized glass" contains the crystal.

In powder X-ray diffractometry, a region where 2θ is 10° to 80° is measured using CuKα radiation, and when a diffraction peak appears, a precipitated crystal is identified by a Hanawalt method.

In the following description, the phrase "chemically strengthened glass" designates a glass which has been subjected to a chemical strengthening treatment, and the phrase "glass for chemical strengthening" designates a glass which has not been subjected to a chemical strengthening treatment yet.

In addition, the phrase "base composition of a chemically strengthened glass" designates a glass composition of a glass for chemical strengthening. Unless an immoderate ion exchange treatment is performed, a glass composition of a part deeper than a depth of a compressive stress layer DOL in a chemically strengthened glass is a base composition of the chemically strengthened glass.

In the present description, any glass composition is expressed by mass % on an oxide basis unless otherwise stated. Mass % will be written as "%" simply.

In addition, the phrase "substantially not contained" in the present description means not to be higher than a level of impurities contained in raw materials etc., that is, not to be intentionally added. Specifically, for example, the phrase means to be lower than 0.1%.

Figure 1:
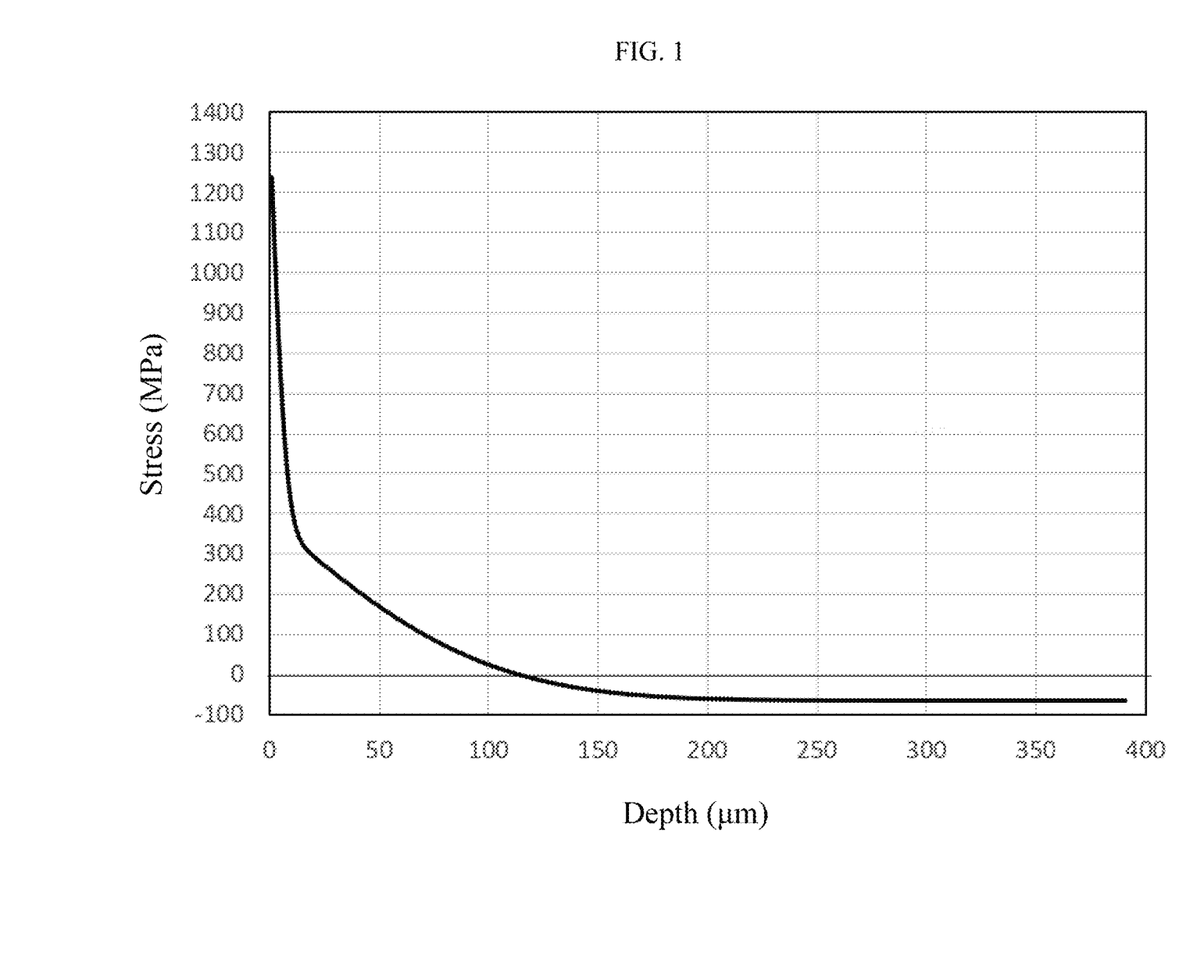
FIG. 1 is a graph showing an example of a stress profile for a chemically strengthened glass.
Figure 2:
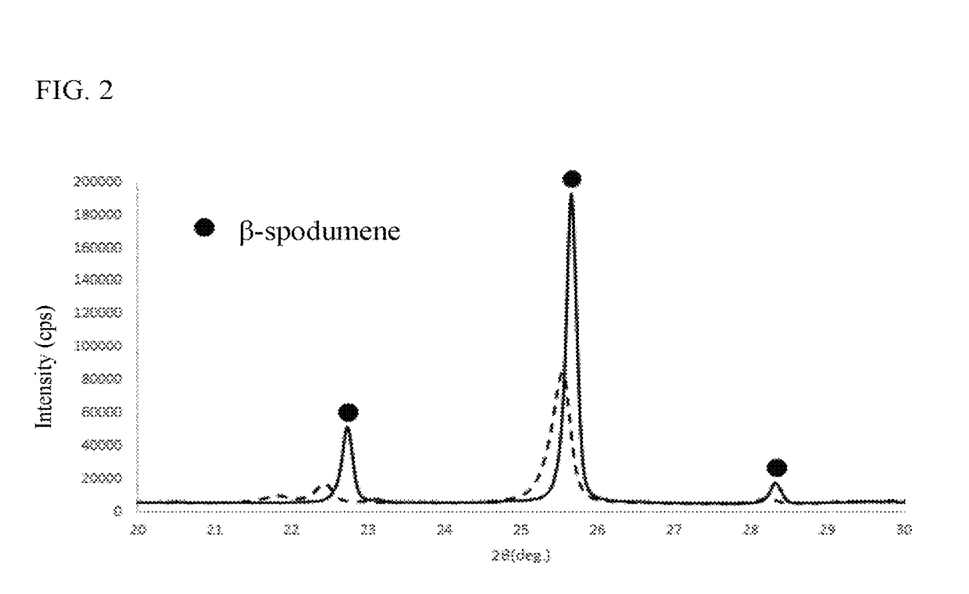
FIG. 2 is a graph showing an example of a powder X-ray diffraction pattern of a crystallized glass.

The phrase "stress profile" in the present description designates a profile showing a compressive stress value with a depth from a glass surface as a variable. FIG. 1 and FIG. 2 show examples of stress profiles. In a stress profile, a tensile stress is expressed as a negative compressive stress.

The "compressive stress value (CS)" can be measured by thinning a cross section of a glass into a thinned sample and analyzing the thinned sample with a birefringence imaging system. An example of the birefringence imaging system includes Abrio-IM which is a birefringence imaging system made by Tokyo Instruments, Inc. The CS may be measured by use of scattered-light photoelasticity. In this method, the CS can be measured by making light incident form a surface of a glass and analyzing polarization of scattered light thereof. An example of a stress meter using scattered-light photoelasticity includes SLP-1000 which is a scattered-light photoelastic stress meter made by Orihara Manufacturing Co., LTD.

In addition, the phrase "depth of compressive stress layer (DOL)" designates a depth where the compressive stress value is zero.

In the following description, the surface compressive stress may be denoted as $CS_0$, a compressive stress at a depth of DOL/4 may be denoted as $CS_1$ and a compressive stress at a depth of DOL/2 may be denoted as $CS_2$.

In addition, a depth where the compressive stress value is $CS_0/2$ is denoted as $DOL_1$ and $m_1$ expressed by the following expression is regarded as an inclination of the stress profile from the glass surface to the depth $DOL_1$.

$$m_1=(CS_0-CS_0/2)/(0-DOL_1)$$

$m_2$ expressed by the following expression is regarded as an inclination of the stress profile from the depth DOL/4 to the depth DOL/2.

$$m_2=(CS_1-CS_2)/(DOL/4-DOL/2)$$

$m_3$ expressed by the following expression is regarded as an inclination of the stress profile from the depth DOL/2 to the depth DOL.

$$m_3=(CS_2-0)/(DOL/2-DOL)$$

The phrase "internal tensile stress (CT)" in the present description designates a tensile stress value at a depth corresponding to ½ of a sheet thickness t.

The phrase "visible light transmittance" in the present description designates an average transmittance with respect to light with a wavelength of 380 nm to 780 nm. In addition, the phrase "haze value" designates a haze value measured with a C illuminant according to JIS K3761:2000.

The phrase "solarization resistance" in the present description means a property of a glass hardly causing solarization.

The phrase "Vickers hardness" in the present description designates Vickers hardness (HV0.1) according to JIS R1610:2003.

In addition, the phrase "fracture toughness value" designates an indentation fracture method (IF method) fracture toughness value according to JIS R1607:2010.

<Crystallized Glass>

It is preferable that the crystallized glass according to the present invention is a crystallized glass in which β-spodumene has been precipitated. The β-spodumene is a crystal expressed as $LiAlSi_2O_6$ and typically showing diffraction peaks at Bragg angles (2θ) of 25.55°±0.05°, 22.71°±0.05°, and 28.20°±0.05° in an X-ray diffraction spectrum. However, when a Rietveld method is used, the precipitation of β-spodumene can be confirmed from the X-ray diffraction spectrum even if the crystal structure is distorted.

The crystallized glass according to the present invention can be obtained by heating and crystallizing an amorphous glass which will be described later.

In addition, the crystallized glass has a similar composition to that of the amorphous glass which will be described later. Therefore, the composition of the crystallized glass is not described.

A crystallized glass containing β-spodumene has excellent chemical strengthening characteristics. In an amorphous glass in which β-spodumene can be precipitated, a β-quartz solid solution or virgilite may be precipitated depending on heat treatment conditions or the like. The virgilite is a crystal expressed as $LiAlSi_2O_6$ in the same manner as the β-spodumene. The crystallized glass containing β-spodumene tends to have a large surface compressive stress by chemical strengthening. The β-spodumene has a crystal structure denser than the β-quartz solid solution or the virgilite. It is therefore considered that a high compressive stress is generated to enhance the chemical strengthening effect when ions in the precipitated crystal are substituted by larger ions owing to an ion exchange treatment for the chemical strengthening.

It is also known that a crystallized glass containing β-spodumene has a small thermal expansion coefficient. The thermal expansion coefficient of the crystallized glass according to the present invention is so small that warpage caused by a thermal treatment accompanying the chemical strengthening or the like can be suppressed. In addition, the crystallized glass is so excellent in thermal shock resistance that the crystallized glass can be heated or cooled rapidly. Thus, the crystallized glass can be easily handled as a glass for chemical strengthening. The average thermal expansion coefficient of the crystallized glass according to the present invention at 50° C. to 350° C. is preferably $30\times10^{-7}$/° C. or less, more preferably $25\times10^{-7}$/° C. or less, even more preferably $20 \times 10^{-7}/°$ C. or less, and particularly preferably $15 \times 10^{-7}/°$ C. or less. The smaller the average thermal expansion coefficient at 50° C. to 350° C. is, the more preferable it is. However, it is typically $10 \times 10^{-7}/°$ C. or more.

It is known that β-spodumene has a high crystal growth rate. Therefore, a crystal contained in a crystallized glass containing β-spodumene tends to grow. Thus, crystallized glasses are low in transparency and large in haze value in many cases. However, the crystallized glass according to the present invention has a large number of very small crystals. Therefore, the crystallized glass is high in transparency and small in haze value in spite of high crystallinity.

The crystallinity of the crystallized glass according to the present invention is preferably 10% or higher, more preferably 15% or higher, even more preferably 20% or higher, and particularly preferably 25% or higher in order to enhance the mechanical strength. On the other hand, in order to enhance the transparency, the crystallinity is preferably 70% or lower, more preferably 60% or lower, and particularly preferably 50% or lower. When the crystallinity is low, the crystallized glass is also superior at the point that bend forming or the like can be easily performed by heating.

The crystallinity can be calculated from X-ray diffraction intensity by a Rietveld method. The Rietveld method is described in "Handbook of Crystal Analysis" edited by the "Handbook of Crystal Analysis" Editing Committee of the Crystallographic Society of Japan (published by Kyoritsu Shuppan Co., Ltd., 1999, pp. 492-499).

The average particle size of the precipitated crystals in the crystallized glass according to the present invention is preferably 300 nm or less, more preferably 200 nm or less, even more preferably 150 nm or less, and particularly preferably 100 nm or less. The average particle size of the precipitated crystals can be obtained from a transmission electron microscope (TEM) image. Also, the average particle size can be estimated from a scanning electron microscope (SEM) image.

Figure 3:
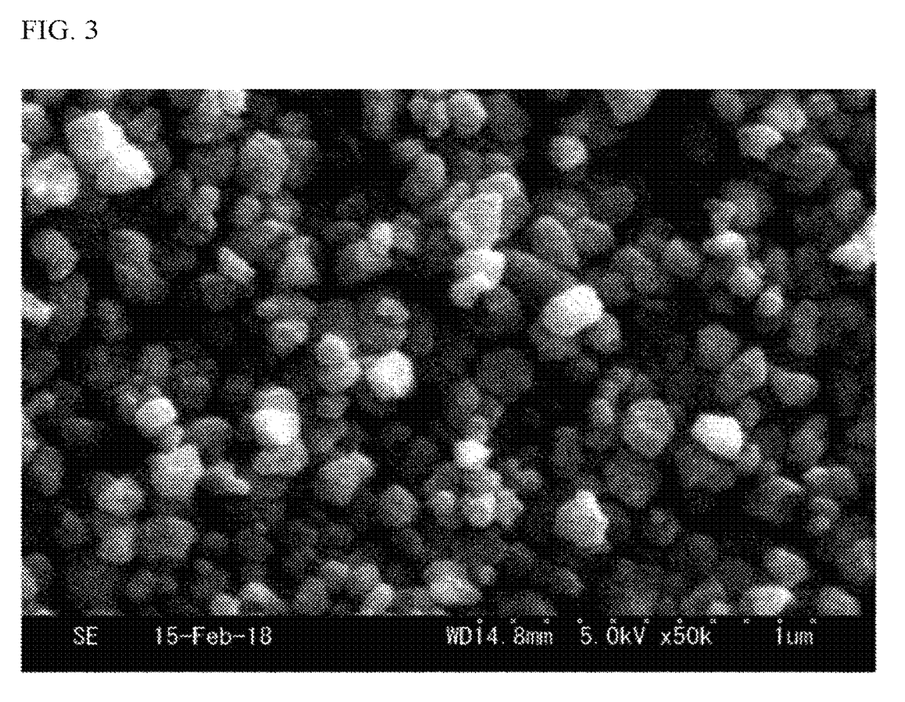
FIG. 3 shows an example of an SEM image of a crystallized glass surface.

FIG. 3 shows an example of an SEM image in which a section of a crystallized glass polished to be mirror-finished and etched with hydrofluoric acid was observed. In the SEM image in FIG. 3, bright parts are precipitated crystals, and dark parts are glass-phases.

Figure 4:
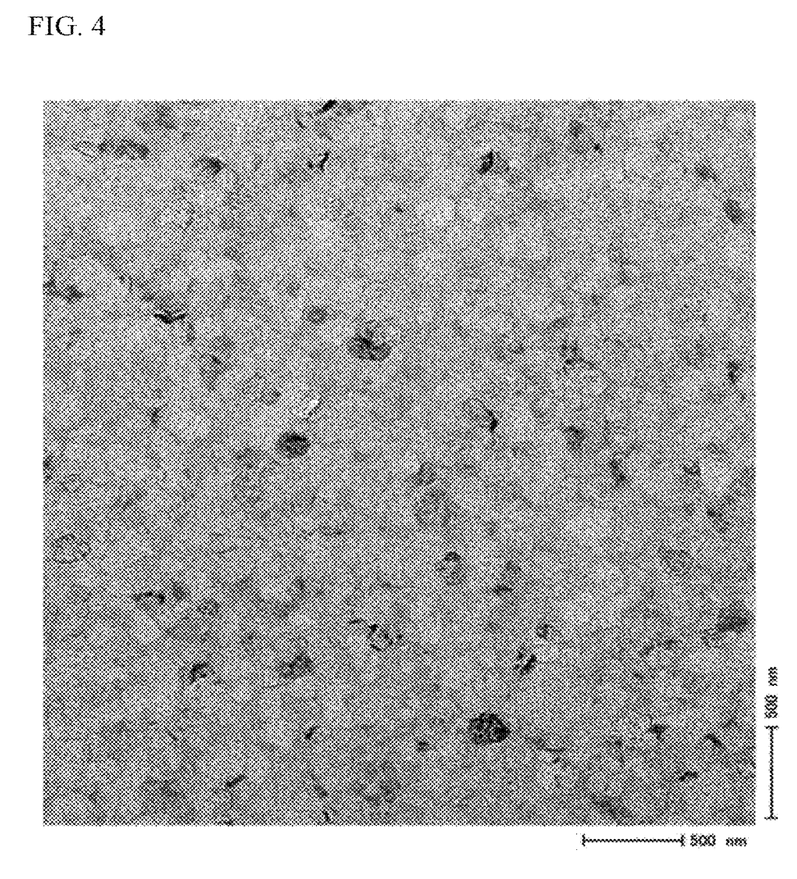
FIG. 4 shows an example of a TEM image of a crystallized glass.

FIG. 4 shows an example of a TEM image in which a piece of the crystallized glass thinned by an ion milling method was observed with an observation magnification of 50,000 times.

The fracture toughness value of the crystallized glass according to the present invention is preferably 0.8 MPa·m$^{1/2}$ or more, and more preferably 1 MPa·m$^{1/2}$ or more. Within the aforementioned range, broken pieces of a chemically strengthened glass can be prevented from easily scattering when the chemically strengthened glass is broken.

The crystallized glass according to the present invention contains crystals. Therefore, the crystallized glass has a large Vickers hardness. Therefore, the crystallized glass is hardly scratched, and is excellent in abrasion resistance. In order to enhance the abrasion resistance, the Vickers hardness is preferably 680 or more, more preferably 700 or more, and even more preferably 740 or more.

When the hardness is excessively high, the crystallized glass cannot be processed easily. Therefore, the Vickers hardness of the crystallized glass according to the present invention is preferably 1,100 or less, more preferably 1,050 or less, and even more preferably 1,000 or less.

The visible light transmittance of the crystallized glass according to the present invention is 85% or higher at a thickness of 0.8 mm. Therefore, when the crystallized glass is used as a cover glass of a portable display, a screen on the display can be viewed easily. The visible light transmittance is more preferably 88% or higher, and even more preferably 90% or higher. The higher the visible light transmittance is, the more preferable it is. However, the visible light transmittance is typically 91% or lower. The transmittance of 90% is as high as the transmittance of a normal amorphous glass.

In addition, the haze value at a thickness of 0.8 mm is preferably 1.0% or lower, more preferably 0.8% or lower, even more preferably 0.6% or lower, further more preferably 0.5% or lower, particularly preferably 0.4% or lower, and most preferably 0.3% or lower. The lower the haze value is, the more preferable it is. However, when the crystallinity is reduced or the crystal particle size is reduced in order to reduce the haze value, the mechanical strength deteriorates. In order to enhance the mechanical strength, the haze value at the thickness of 0.8 mm is preferably 0.05% or higher, more preferably 0.07% or higher, and even more preferably 0.09% or higher.

In order to make it possible to conspicuously improve the strength by chemical strengthening, the thickness (t) of the crystallized glass according to the present invention is preferably 3 mm or less, and more preferably, as described stepwise, 2 mm or less, 1.6 mm or less, 1.1 mm or less, 0.9 mm or less, 0.8 mm or less, or 0.7 mm or less. On the other hand, in order to obtain sufficient strength by the chemical strengthening treatment, the thickness (t) is preferably 0.3 mm or more, more preferably 0.4 mm or more, and even more preferably 0.5 mm or more.

The glass composition of the crystallized glass according to the present invention is the same as the composition of the amorphous glass which has not been crystallized yet. Therefore, the glass composition will be described in the section of the amorphous glass.

<Chemically Strengthened Glass>

The chemically strengthened glass obtained by chemically strengthening the crystallized glass according to the present invention (hereinafter also referred to as "strengthened glass of the present invention") has a surface compressive stress $CS_0$ of 600 MPa or more. Thus, favorably, the strengthened glass is hardly cracked by deformation such as bending. The surface compressive stress of the strengthened glass of the present invention is more preferably 800 MPa or more.

The strengthened glass of the present invention has a depth of a compressive stress layer DOL of 80 μm or more. Thus, favorably, the strengthened glass is hardly cracked even when the surface thereof is scratched. The DOL is preferably 100 μm or more.

In addition, it is more preferable that the maximum depth where the compressive stress value is 50 MPa or more (hereinafter also referred to as "50 MPa depth") is 80 μm or more. When the 50 MPa depth is 80 μm or more, drop strength to asphalt can be enhanced. The 50 MPa depth is even more preferably 100 μm or more.

Here, the drop strength to asphalt can be evaluated by the following dropping-onto-asphalt test.

(Dropping-onto-Asphalt Test)

A glass sheet (120 mm×60 mm×0.8 mm) to be evaluated is likened to a cover glass for a smartphone, attached to a housing simulating the smartphone, and dropped onto a flat asphalt surface. The total mass of the glass sheet and the housing is set at about 140 g.

The test is started at a height of 30 cm. When the chemically strengthened glass sheet is not cracked, the height is increased by 10 cm, and the drop test is repeated. Thus, the height (in units of cm) at which the glass sheet is cracked is recorded. The series of tests are performed as one set, and 10 sets are repeated. An average height at which the glass sheet is cracked is regarded as "drop height".

The drop height of the strengthened glass of the present invention in the dropping-onto-asphalt test is preferably 100 cm or more.

In the strengthened glass of the present invention, an inclination $m_1$ of a stress profile from the glass surface to the depth $DOL_1$ is preferably −50 MPa/µm or less, more preferably −55 MPa/µm or less, and even more preferably −60 MPa/µm or less. The chemically strengthened glass is a glass having a compressive stress layer formed in its surface. A tensile stress occurs in a part far from the surface. Accordingly, the stress profile thereof has a negative inclination from the surface at a depth of zero toward the inside. Therefore, when $m_1$ is a negative value and absolute value thereof is large, it is possible to obtain a stress profile having a large surface compressive stress CSo and a small internal tensile stress CT.

An inclination $m_2$ of the stress profile from a depth of DOL/4 to a depth of DOL/2 has a negative value. The inclination $m_2$ is preferably −5 or more, more preferably −3 or more, and even more preferably −2 or more in order to suppress broken pieces of the strengthened glass from scattering when the strengthened glass is broken. When $m_2$ is too large, the 50 MPa depth is reduced so that there is a concern that the drop strength to asphalt may be insufficient. In order to increase the 50 MPa depth, $m_2$ is preferably −0.3 or less, more preferably −0.5 or less, and even more preferably −0.7 or less.

In the strengthened glass of the present invention, an inclination $m_3$ of the stress profile from the depth of DOL/2 to a depth of DOL has a negative value. The inclination $m_3$ is preferably −5 or more, more preferably −3 or more, and even more preferably −2 or more in order to suppress broken pieces of the strengthened glass from scattering when the strengthened glass is broken. When the absolute value of $m_3$ is too small, the 50 MPa depth is reduced so that the strengthened glass tends to be cracked when it is scratched. In order to increase the 50 MPa depth, $m_3$ is preferably −0.3 or less, more preferably −0.5 or less, and even more preferably −0.7 or less.

It is preferable that a ratio $m_2/m_3$ between the inclination $m_2$ and the inclination $m_3$ is 2 or less so that a deep DOL and a small CT can be obtained. The ratio $m_2/m_3$ is more preferably 1.5 or less, and even more preferably 1 or less. In order to prevent occurrence of cracks in an end face of the strengthened glass, the ratio $m_2/m_3$ is preferably 0.3 or more, more preferably 0.5 or more, and even more preferably 0.7 or more.

It is preferable that the internal tensile stress (CT) of the strengthened glass of the present invention is 110 MPa or less so that broken pieces can be suppressed from scattering when the chemically strengthened glass is broken. The CT is more preferably 100 MPa or less, and even more preferably 90 MPa or less. On the other hand, when the CT is reduced, the surface compressive stress is reduced. Thus, there is a tendency that sufficient strength cannot be obtained easily. Therefore, the CT is preferably 50 MPa or more, more preferably 55 MPa or more, and even more preferably 60 MPa or more.

Four point bending strength of the strengthened glass of the present invention is preferably 900 MPa or more.

Here, the four point bending strength is measured by use of 40 mm×5 mm×0.8 mm test pieces with a lower span of 30 mm and an upper span of 10 mm and at a cross head speed of 0.5 mm/min. An average value of 10 test pieces is regarded as the four point bending strength.

The Vickers hardness of the strengthened glass of the present invention tends to increase owing to a chemical strengthening treatment in comparison with that before the treatment. It is considered that it is because a compressive stress occurs in crystals owing to ion exchange between small ions in the crystals and large ions in molten salt.

The Vickers hardness of the strengthened glass of the present invention is preferably 720 or more, more preferably 740 or more, and even more preferably 780 or more. On the other hand, the Vickers hardness of the strengthened glass of the present invention is typically 950 or less.

FIG. 2 shows an X-ray diffraction pattern of a strengthened glass of the present invention and an X-ray diffraction pattern of a crystallized glass (glass for chemical strengthening) which has not been strengthened yet, by way of example. In FIG. 2, the solid line designates an X-ray diffraction pattern measured in a crystallized glass sheet which has not been strengthened yet. Diffraction lines of β-spodumene crystals can be recognized as shown by the black circles in FIG. 2. The broken line designates an X-ray diffraction pattern measured in the crystallized glass sheet which has been chemically strengthened. It is considered that the positions of diffraction peaks are shifted to the lower angle side by the chemical strengthening owing to the lattice spacing increased by ion exchange which has occurred between small ions in the crystals and large ions in the molten salt.

However, when the present inventors compared powder X-ray diffraction patterns before and after chemical strengthening, such a shift of a diffraction line could not be recognized. It is considered that this is because a change of the lattice spacing caused by the chemical strengthening treatment occurs only in the vicinity of the surface of the glass sheet but the internal crystals are not changed by the chemical strengthening treatment.

The visible light transmittance, the haze value and the composition of the strengthened glass of the present invention are the same as those of the crystallized glass according to the present invention. Therefore, description thereof will be omitted.

The strengthened glass of the present invention as a whole has substantially the same composition as the crystallized glass which has not been strengthened yet, unless an immoderate ion exchange treatment has been performed thereon. Particularly the composition of a part which is the farthest from the glass surface is the same as the composition of the crystallized glass which has not been strengthened yet, unless an immoderate ion exchange treatment has been performed thereon.

<Amorphous Glass>

The amorphous glass in the present invention includes, as expressed by mass % on an oxide basis, 58 to 70% of $SiO_2$, 15 to 30% of $Al_2O_3$, 2 to 10% of $Li_2O$, 0 to 5% of $Na_2O$, 0 to 2% of $K_2O$, 0 to 1.8% of SrO, 0 to 2% of BaO, 0.5 to 6% of $SnO_2$, 0.5 to 6% of $ZrO_2$, and 0 to 6% of $P_2O_5$, in which a total content of SrO and BaO is 0.1 to 3%, and a total content of $Na_2O$ and $K_2O$ is 1 to 5%.

This glass composition will be explained below.

In the amorphous glass of the present invention, $SiO_2$ is a component forming a network structure of the glass. In addition, $SiO_2$ is a component enhancing the chemical durability, and it is also a constituent component of β-spodumene which is precipitated crystal. The content of $SiO_2$ is preferably 58% or higher. The content of $SiO_2$ is more preferably 60% or higher, and even more preferably 64% or higher. On the other hand, in order to improve the meltability, the content of $SiO_2$ is preferably 70% or lower, more preferably 68% or lower, and even more preferably 66% or lower.

$Al_2O_3$ is a component effective in increasing a surface compressive stress caused by chemical strengthening. In addition, $Al_2O_3$ is a constituent component of β-spodumene. Therefore, $Al_2O_3$ is essential. The content of $Al_2O_3$ is preferably 15% or higher. The content of $Al_2O_3$ is more preferably 20% or higher. On the other hand, in order to prevent the devitrification temperature of the glass from being too high, the content of $Al_2O_3$ is preferably 30% or lower, and more preferably 25% or lower.

$Li_2O$ is a component forming a surface compressive stress by the effect of ion exchange. $Li_2O$ is a constituent component of β-spodumene. Therefore, $Li_2O$ is essential.

The content of $Li_2O$ is preferably 2% or higher, and more preferably 4% or higher. On the other hand, the content of $Li_2O$ is preferably 10% or lower, more preferably 8% or lower, and even more preferably 6% or lower.

The content ratio $Li_2O/Al_2O_3$ between $Li_2O$ and $Al_2O_3$ is preferably 0.3 or less in order to enhance the transparency. When the content ratio $Li_2O/Al_2O_3$ is too large, it is considered that crystallization progresses suddenly during a thermal treatment so that the particle size of crystals increases to lower the transparency.

$Na_2O$ is a component improving the meltability of the glass.

$Na_2O$ is not essential, but the content of $Na_2O$ is preferably 0.5% or higher, and more preferably 1% or higher. When $Na_2O$ is too rich, β-spodumene crystals are hardly precipitated, or the chemical strengthening characteristics deteriorate. Therefore, the content of $Na_2O$ is preferably 5% or lower, more preferably 4% or lower, and even more preferably 3% or lower.

$K_2O$ is a component decreasing the melting temperature of the glass in the same manner as $Na_2O$. $K_2O$ may be contained.

When $K_2O$ is contained, the content of $K_2O$ is preferably 0.5% or higher, and more preferably 1% or higher. In addition, the total content $Na_2O$ of $Na_2O$ and $K_2O$ is preferably 1% or higher, and more preferably 2% or higher.

When $K_2O$ is too rich, β-spodumene crystals are hardly precipitated. Therefore, the content of $K_2O$ is preferably 2% or lower. In addition, the total content $Na_2O+K_2O$ of $Na_2O$ and $K_2O$ is preferably 5% or lower, more preferably 4% or lower, and even more preferably 3% or lower in order to enhance the transparency.

$ZrO_2$ is a component forming crystal nuclei during a crystallization treatment. It is preferable that $ZrO_2$ is contained. The content of $ZrO_2$ is preferably 0.5% or higher, and more preferably 1% or higher. On the other hand, in order to suppress devitrification during melting, the content of $ZrO_2$ is preferably 6% or lower, more preferably 5% or lower, and even more preferably 4% or lower.

$SnO_2$ is a component forming crystal nuclei during a crystallization treatment. $SnO_2$ is highly effective in promoting precipitation of β-spodumene crystals. It is therefore preferable that 0.5% or higher of $SnO_2$ is contained. The content of $SnO_2$ is more preferably 1% or higher, and even more preferably 1.5% or higher. When the content of $SnO_2$ is 6% or lower, defects caused by unmelted parts hardly occur in the glass. Therefore, the content of $SnO_2$ is preferably 6% or lower, more preferably 5% or lower, and even more preferably 4% or lower.

$SnO_2$ is also a component enhancing the solarization resistance. In order to suppress solarization, the content of $SnO_2$ is preferably 1% or higher, and more preferably 1.5% or higher.

$TiO_2$ or $ZrO_2$ is generally known as a component forming crystal nuclei in a crystallized glass. However, according to examinations of the present inventors, the effect of $ZrO_2$ was higher than the effect of $TiO_2$ in the crystallized glass of the present invention. In addition, when $SnO_2$ was added, the transparency of the crystallized glass could be enhanced.

When the total content $SnO_2+ZrO_2$ of $SnO_2$ and $ZrO_2$ is 3% or higher, a large number of $ZrO_2$ nuclei can be formed to improve the transmittance. The content $SnO_2+ZrO_2$ is preferably 3% or higher, more preferably 4% or higher, even more preferably 5% or higher, particularly preferably 6% or higher, and most preferably 7% or higher. On the other hand, in order to prevent defects caused by unmelted parts from appearing in the glass, the content $SnO_2+ZrO_2$ is preferably 12% or lower, more preferably 10% or lower, even more preferably 9% or lower, and particularly preferably 8% or lower.

When both $SnO_2$ and $ZrO_2$ are contained, the ratio $SnO_2/(SnO_2+ZrO_2)$ of the $SnO_2$ content to the total content of the both is preferably 0.3 or more, more preferably 0.35 or more, and even more preferably 0.45 or more in order to enhance the transparency.

On the other hand, in order to enhance the strength, the ratio $SnO_2/(SnO_2+ZrO_2)$ is preferably 0.7 or less, more preferably 0.65 or less, and even more preferably 0.6 or less.

$TiO_2$ is a component forming crystal nuclei in the crystallized glass. In addition, $TiO_2$ is a component preventing broken pieces from easily scattering when the chemically strengthened glass is broken. Therefore, $TiO_2$ may be contained. When $TiO_2$ is contained, the content of $TiO_2$ is preferably 0.1% or higher, more preferably 0.15% or higher, and even more preferably 0.2% or higher.

On the other hand, when the content of $TiO_2$ exceeds 5%, the glass tends to be devitrified when it is melted. Thus, there is a concern that the quality of the chemically strengthened glass deteriorates. The content of $TiO_2$ is preferably 3% or lower, and more preferably 1.5% or lower.

In addition, when a glass containing $Fe_2O_3$ contains $TiO_2$, a composite called an ilmenite composite is formed so that the glass tends to be colored in yellow or brown. $Fe_2O_3$ may be normally contained as impurity in any glass. Therefore, in order to prevent coloring, the content of $TiO_2$ is preferably 1% or lower, more preferably 0.5% or lower, even more preferably 0.25% or lower, and particularly preferably substantially not contained.

$P_2O_5$ is not essential, but has an effect of promoting phase separation of the glass to thereby promote crystallization. Therefore, $P_2O_5$ may be contained. When $P_2O_5$ is contained, the content of $P_2O_5$ is preferably 0.1% or higher, more preferably 0.5% or higher, even more preferably 1% or higher, and particularly preferably 2% or higher. On the other hand, when the content of $P_2O_5$ is excessive, broken pieces tend to scatter when the chemically strengthened glass is broken. In addition, the acid resistance deteriorates conspicuously. The content of $P_2O_5$ is preferably 6% or lower, more preferably 5% or lower, even more preferably 4% or lower, particularly preferably 3% or lower, and extremely preferably 2% or lower. In order to further increase the acid resistance, it is preferable that $P_2O_5$ is substantially not contained.

$B_2O_3$ is a component improving the chipping resistance of the glass for chemical strengthening or the chemically strengthened glass, and improving the meltability. Therefore, $B_2O_3$ may be contained. Although $B_2O_3$ is not essential, the content of $B_2O_3$, if contained, is preferably 0.5% or higher, more preferably 1% or higher, and even more preferably 2% or higher in order to improve the meltability. On the other hand, when the content of $B_2O_3$ exceeds 5%, striae occur during melting so that the quality of the glass for chemical strengthening tends to deteriorate. Therefore, the content of $B_2O_3$ is preferably 5% or lower. The content of $B_2O_3$ is more preferably 4% or lower, even more preferably 3% or lower, and particularly preferably 1% or lower. In order to enhance the acid resistance, it is preferable that $B_2O_3$ is substantially not contained.

MgO is a component increasing the surface compressive stress of the chemically strengthened glass. In addition, MgO is a component suppressing broken pieces from scattering when the chemically strengthened glass is broken. Therefore, MgO may be contained. When MgO is contained, the content of MgO is preferably 0.5% or higher, and more preferably 1% or higher. On the other hand, in order to suppress devitrification during melting, the content of MgO is preferably 5% or lower, more preferably 4% or lower, and even more preferably 3% or lower.

CaO is a component improving the meltability of the glass for chemical strengthening. CaO may be contained in order to prevent devitrification during melting and to improve the meltability while suppressing the thermal expansion coefficient from increasing. When CaO is contained, the content of CaO is preferably 0.5% or higher, and more preferably 1% or higher. On the other hand, in order to enhance the ion exchange characteristics, the content of CaO is preferably 4% or lower, more preferably 3% or lower, and particularly preferably 2% or lower.

SrO is a component improving the meltability of the glass for chemical strengthening. In addition, SrO is a component increasing the refractive index of the glass. SrO can make the refractive index of residual glass phases after crystallization close to the refractive index of precipitated crystals so as to improve the transmittance of the crystallized glass and decrease the haze value. Therefore, SrO may be contained. When SrO is contained, the content of SrO is preferably 0.1% or higher, more preferably 0.2% or higher, even more preferably 0.5% or higher, and particularly preferably 1% or higher.

On the other hand, when the content of SrO is too high, the ion exchange rate decreases. Therefore, the content of SrO is preferably 2.5% or lower, more preferably 1.8% or lower, even more preferably 1.5% or lower, particularly preferably 1% or lower, and most preferably 0.5% or lower.

BaO is a component improving the meltability of the glass for chemical strengthening. In addition, BaO is a component increasing the refractive index of the glass. BaO can make the refractive index of residual glass phases after crystallization close to the refractive index of β-spodumene crystal phases so as to improve the transmittance of the crystallized glass and decrease the haze value. Therefore, BaO may be contained. When BaO is contained, the content of BaO is preferably 0.1% or higher, more preferably 0.2% or higher, even more preferably 0.5% or higher, and particularly preferably 1% or higher. On the other hand, when the content of BaO is too high, the ion exchange rate decreases. Therefore, the content of BaO is preferably 2% or lower, more preferably 1.5% or lower, even more preferably 1% or lower, particularly preferably 0.5% or lower, and most preferably 0.3% or lower.

In order to increase the transmittance of the chemically strengthened glass and decrease the haze value, it is preferable to contain one or both of SrO and BaO. The total content of SrO and BaO is preferably 0.1% or higher, more preferably 0.2% or higher, even more preferably 0.5% or higher, further more preferably 1% or higher, and particularly preferably 1.5% or higher. On the other hand, when the total content of SrO and BaO is too high, the difference between the refractive index of the residual glass phases after the crystallization and the refractive index of the β-spodumene crystal phases increases to lower the transmittance. Therefore, the total content of SrO and BaO is preferably 3% or lower, more preferably 2% or lower, even more preferably 1.5% or lower, further more preferably 1% or lower, particularly preferably 0.8% or lower, and most preferably 0.5% or lower.

ZnO is a component decreasing the thermal expansion coefficient of the glass for chemical strengthening and increasing the chemical durability. ZnO may be contained in order to improve the transmittance of the crystallized glass and decrease the haze value. In order to make the refractive index of residual glass phases after crystallization close to the refractive index of β-spodumene crystal phases, the content of ZnO, if contained, is preferably 0.5% or higher, more preferably 1% or higher, even more preferably 1.5% or higher, and particularly preferably 2% or higher.

On the other hand, in order to suppress devitrification during melting, the content of ZnO is preferably 4% or lower, more preferably 3% or lower, and even more preferably 2% or lower.

Each of $Y_2O_3$, $La_2O_3$, $Nb_2O_5$ and $Ta_2O_5$ is a component preventing broken pieces from easily scattering when the chemically strengthened glass is broken. The components may be contained to increase the refractive index. When those components are contained, the total content $Y_2O_3+La_2O_3+Nb_2O_5$ of $Y_2O_3$, $La_2O_3$ and $Nb_2O_5$ is preferably 0.5% or higher, more preferably 1% or higher, even more preferably 1.5% or higher, and particularly preferably 2% or higher. On the other hand, in order to prevent the glass from being easily devitrified during melting, the content $Y_2O_3+La_2O_3+Nb_2O_5$ is preferably 4% or lower, more preferably 3% or lower, even more preferably 2% or lower, and particularly preferably 1% or lower.

The total content $Y_2O_3+La_2O_3+Nb_2O_5+Ta_2O_5$ of $Y_2O_3$, $La_2O_3$, $Nb_2O_5$ and $Ta_2O_5$ is preferably 0.5% or higher, more preferably 1% or higher, even more preferably 1.5% or higher, and particularly preferably 2% or higher. On the other hand, in order to prevent the glass from being easily devitrified during melting, the content $Y_2O_3+La_2O_3+Nb_2O_5+Ta_2O_5$ is preferably 4% or lower, more preferably 3% or lower, even more preferably 2% or lower, and particularly preferably 1% or lower.

In addition, $CeO_2$ may be contained. $CeO_2$ has an effect of oxidizing the glass. When a large amount of $SnO_2$ is contained, $CeO_2$ may suppress $SnO_2$ from being reduced to SnO which is a coloring component. Thus, $CeO_2$ may suppress coloring. When $CeO_2$ is contained, the content of $CeO_2$ is preferably 0.03% or higher, more preferably 0.05% or higher, and even more preferably 0.07% or higher. When $CeO_2$ is used as an oxidizer, the content of $CeO_2$ is preferably 1.5% or lower and more preferably 1% or lower in order to enhance the transparency.

Further, when the strengthened glass is colored for use, coloring components may be added to the extent of not impeding the attainment of desired chemical strengthening characteristics. Preferred examples of the coloring components include $CO_3O_4$, $MnO_2$, $Fe_2O_3$, NiO, CuO, $Cr_2O_3$, $V_2O_5$, $Bi_2O_3$, $SeO_2$, $Er_2O_3$, and $Nd_2O_3$.

The total content of the coloring components is preferably 1% or lower. In order to further increase the visible light transmittance of the glass, it is preferable that those components are substantially not contained.

In addition, $SO_3$, chlorides, fluorides, etc. may be contained properly as refining agents during melting of the glass. It is preferable that $As_2O_3$ is not contained. When $Sb_2O_3$ is contained, the content of $Sb_2O_3$ is preferably 0.3% or lower, more preferably 0.1% or lower, and most preferably substantially not contained.

<Method for Manufacturing Chemically Strengthened Glass>

The chemically strengthened glass according to the present invention is manufactured as follows. That is, the aforementioned amorphous glass is subjected to a heating treatment to obtain a crystallized glass, and the obtained crystallized glass is subjected to a chemical strengthening treatment.

<Manufacturing of Amorphous Glass>

The amorphous glass can be, for example, manufactured in the following method. Incidentally, the following manufacturing method is an example in which a sheet-like chemically strengthened glass is manufactured.

Glass raw materials are prepared to obtain a glass having a desired composition. The glass raw materials are heated and melted in a glass melting furnace. After that, the molten glass is homogenized by bubbling, stirring, addition of a refining agent, etc., and formed into a glass sheet with a predetermined thickness by a known forming method, followed by annealing. Alternatively, the molten glass may be formed into a sheet by a method in which the molten glass is formed into a block, annealed, and then cut.

Examples of a method for forming the sheet-like glass include a float process, a press process, a fusion process, and a down draw process. Particularly when a large-size glass sheet is manufactured, the float process is preferred. Alternatively, a continuously forming method other than the float process, for example, the fusion process and the down draw process are also preferred.

(Crystallization Treatment)

A heating treatment is performed on the amorphous glass obtained in the aforementioned procedure. Thus, a crystallized glass is obtained.

The heating treatment is preferably a two-step heating treatment in which the temperature is increased from a room temperature to a first treatment temperature and retained for a predetermined time, and the temperature is then increased to a second treatment temperature which is higher than the first treatment temperature, and retained for a predetermined time.

When the two-step heating treatment is used, the first treatment temperature is preferably within a temperature range in which a production rate of crystal nuclei is increased in the glass composition, and the second treatment temperature is preferably within a temperature range in which a growth rate of crystals is increased in the glass composition. In addition, the time for which the first treatment temperature is retained is preferably long enough to produce a sufficient number of crystal nuclei. When a large number of crystal nuclei are produced, the size of each crystal can be reduced. Thus, it is possible to obtain a crystallized glass having high transparency.

The first treatment temperature is, for example, 550° C. to 800° C., and the second treatment temperature is, for example, 850° C. to 1,000° C. The glass is retained at the first treatment temperature for 2 hours to 10 hours, and then retained at the second treatment temperature for 2 hours to 10 hours.

The crystallized glass obtained in the aforementioned procedure is ground and polished if necessary. Thus, a crystallized glass sheet is formed. In the case where the crystallized glass sheet is cut into a predetermined shape and size, or chamfered, it is preferable that cutting or chamfering is performed before a chemical strengthening treatment so that a compressive stress layer can be also formed in end faces by the chemical strengthening treatment.

(Chemical Strengthening Treatment)

The chemical strengthening treatment is a treatment in which the glass is brought into contact with the metal salt by a method, for example, immersing the glass into a melt of the metal salt (such as potassium nitrate) containing metal ions (typically Na ions or K ions) having large ionic radii, so that metal ions (typically Na ions or Li ions) having small ionic radii in the glass are replaced by the metal ions (typically Na ions or Ki ions for the Li ions, and K ions for the Na ions) having large ionic radii.

In order to increase the rate of the chemical strengthening treatment, it is preferable to use "Li—Na exchange" in which Li ions in the glass are replaced by Na ions. On the other hand, in order to form a large compressive stress by the ion exchange, it is preferable to use "Na—K exchange" in which Na ions in the glass are replaced by K ions.

Examples of the molten salt for the chemical strengthening treatment include nitrates, sulfates, carbonates, and chlorides. Among them, examples of the nitrates include lithium nitrate, sodium nitrate, potassium nitrate, cesium nitrate, and silver nitrate. Examples of the sulfates include lithium sulfate, sodium sulfate, potassium sulfate, cesium sulfate, and silver sulfate. Examples of the carbonates include lithium carbonate, sodium carbonate, and potassium carbonate. Examples of the chlorides include lithium chloride, sodium chloride, potassium chloride, cesium chloride, and silver chloride. Each of those molten salts may be used alone, or a plurality of kinds of them may be used in combination.

As for the treatment conditions of the chemical strengthening treatment, time, temperature, etc. are selected suitably in consideration of the glass composition, the kind of molten salt, etc.

It is preferable that the strengthened glass of the present invention is, for example, obtained by the following two-step chemical strengthening treatment.

First, the crystallized glass of the present invention is immersed in metal salt containing Na ions (such as sodium nitrate) at about 350 to 500° C. for about 0.1 to 10 hours. Thus, ion exchange occurs between the Li ions in the crystallized glass and the Na ions in the metal salt so that a compressive stress layer can be formed. For example, the compressive stress layer has a surface compressive stress of 200 MPa or more and a depth of a compressive stress layer of 80 μm or more. On the other hand, when the surface compressive stress exceeds 1,000 MPa, it is difficult to increase the DOL while keeping the CT low. The surface compressive stress is preferably 900 MPa or less, more preferably 700 MPa or less, and even more preferably 600 MPa or less.

Next, the glass is immersed in metal salt containing K ions (such as potassium nitrate) at about 350 to 500° C. for about 0.1 to 10 hours. Thus, a large compressive stress occurs in, of the compressive stress layer formed in the previous treatment, for example, a part within a depth range of about 10 μm or less.

According to such a two-step treatment, it is possible to easily obtain a preferable stress profile with a surface compressive stress of 600 MPa or more.

The glass may be immersed in the metal salt containing K ions after the glass is first immersed in the metal salt containing Na ions and then retained at 350 to 500° C. in the atmosphere for 1 to 5 hours. The retention temperature is preferably 425° C. to 475° C., and more preferably 440° C. to 460° C.

When the glass is retained at the high temperature in the atmosphere, the Na ions introduced into the glass from the metal salt by the first-step treatment are thermally diffused in the glass. Thus, a more preferable stress profile can be formed to thereby enhance the drop strength to asphalt.

Alternatively, after the glass is immersed in the metal salt containing Na ions, instead of being retained in the atmosphere, the glass may be immersed in metal salt containing Na ions and Li ions (such as mixture salt of sodium nitrate and lithium nitrate) at 350 to 500° C. for 0.1 to 20 hours.

When the glass is immersed in the metal salt containing Na ions and Li ions, ion exchange occurs between the Na ions in the glass and the Li ions in the metal salt. Thus, a more preferable stress profile can be formed to thereby enhance the drop strength to asphalt.

When such a two-step or three-step strengthening treatment is performed, the total treatment time is preferably 10 hours or less, more preferably 5 hours or less, and even more preferably 3 hours or less in terms of production efficiency. On the other hand, in order to obtain a desired stress profile, the total treatment time needs to be 0.5 hours or more. More preferably the total treatment time is 1 hour or more.

The strengthened glass of the present invention is useful particularly as a cover glass for use in a mobile device or the like such as a cellular phone or a smartphone. Further, it is also useful as a thing not intended to be portable, such as a cover glass for a display device of a television set, a personal computer, a touch panel, etc., an elevator wall surface, or a wall surface (whole-surface display) of an architecture such as a house or a building. In addition, it is also useful as a construction material such as a window glass, a table top, an interior decoration of a car, an airplane or the like, or a cover glass for them, or for application such as a housing with a curved shape.

In addition, the strengthened glass of the present invention is high in transparency but low in UV transmittance. Therefore, particularly when it is used as a cover glass for an organic EL display, operational stability or longer lifetime can be provided for the organic EL display favorably.

EXAMPLES

The present invention will be described along its examples below. However, the present invention is not limited thereto. Examples 1 to 8 are Working Examples, and Examples 9 and 10 are Comparative Examples.

<Preparation and Evaluation of Amorphous Glass>

Glass raw materials were prepared to have a glass composition shown by mass % on an oxide basis in Table 1, and weighed to obtain a glass of 800 g. Next, the mixed glass raw materials were put into a platinum crucible, and transferred into an electric furnace at 1,500 to 1,700° C. Thus, the glass raw materials were melted, degassed and homogenized for about 5 hours.

The obtained molten glass was poured into a mold, and retained at a temperature as high as a glass transition point for 1 hour. After that, the molten glass was cooled down to a room temperature at a rate of 0.5° C./min. Thus, a glass block was obtained. Table 1 shows evaluation results of a glass transition point and a refractive index of each amorphous glass obtained by using a part of the block obtained thus. Blanks designate unevaluated items.

(Glass Transition Point)

Based on JIS R1618:2002, a thermal expansion curve was obtained with a heating rate set at 10° C./min by use of a thermal dilatometer (TD5000SA made by Bruker AXS GmbH.), and a glass transition point Tg (in units of ° C.) was obtained from the obtained thermal expansion curve.

(Refractive Index before Crystallization)

The obtained glass block was polished and mirror-finished to be a size of 15 mm×15 mm×0.8 mm. A refractive index was measured by a V-block method by use of a precision refractive index meter KPR-2000 (made by Shimadzu Device Corporation). Incidentally, the refractive index was also measured in the same manner after the crystallization treatment which will be described later. Results are shown in Table 1 and Table 2. Incidentally, blanks designate unmeasured items.

TABLE 1

| | Glass 1 | Glass 2 | Glass 3 | Glass 4 | Glass 5 | Glass 6 | Glass 7 | Glass 8 | Glass 9 | Glass 10 |
|---|---|---|---|---|---|---|---|---|---|---|
| $SiO_2$ | 62.9 | 62.9 | 62.4 | 62.5 | 62.3 | 62.34 | 63.13 | 63.4 | 61.9 | 65.0 |
| $Al_2O_3$ | 22.4 | 22.4 | 21.9 | 21.9 | 21.82 | 22.36 | 22.44 | 22.49 | 22.4 | 22.2 |
| $Li_2O$ | 4.3 | 4.3 | 4.3 | 4.3 | 4.28 | 4.29 | 4.31 | 4.32 | 4.3 | 4.3 |
| $Na_2O$ | 2 | 2 | 2 | 2 | 1.99 | 2 | 2.01 | 2.01 | 2 | 2.0 |
| $K_2O$ | 0 | 0 | 0 | 0 | 0 | 0 | 0 | 0 | 0 | 0.0 |
| $ZrO_2$ | 2.3 | 2.3 | 2.3 | 2.3 | 2.28 | 2.29 | 2.3 | 2.31 | 2.3 | 2.6 |
| $SnO_2$ | 2.1 | 2.1 | 2.1 | 2.1 | 2.1 | 2.1 | 2.11 | 2.12 | 2.1 | 2.4 |
| $P_2O_5$ | 3 | 3 | 3 | 3.5 | 4.25 | 3 | 3.01 | 0 | 3 | 1.5 |
| $B_2O_3$ | 0 | 0 | 0 | 0 | 0 | 0 | 0 | 0 | 0 | 0.0 |
| ZnO | 0 | 0 | 0 | 0 | 0 | 0.61 | 0 | 0 | 0 | 0.0 |
| MgO | 0 | 0 | 0 | 0 | 0 | 0 | 0 | 0 | 0 | 0.0 |
| SrO | 1 | 0 | 0 | 0.6 | 0 | 0 | 0 | 0 | 2 | 0 |
| BaO | 0 | 1 | 2 | 0.8 | 0.99 | 0.99 | 0.69 | 0.35 | 0 | 0 |
| $Na_2O + K_2O$ | 2 | 2 | 2 | 2 | 1.99 | 2 | 2.01 | 2.01 | 2 | 2 |
| Tg | 714 | 718 | 714 | 709 | 708 | 698 | 710 | 711 | | 738 |
| refractive index before crystallization | 1.5158 | 1.5156 | 1.5168 | 1.5154 | 1.5136 | 1.5173 | 1.5151 | 1.5145 | 1.518 | 1.5163 |

<Crystallization Treatment and Evaluation of Crystallized Glass>

The obtained glass block was processed into a dimensions of 50 mm×50 mm×1.5 mm, and a thermal treatment was then performed thereon under the conditions shown in Table 2. Thus, each crystallized glass (Example 1 to Example 10) was obtained. The line of crystallization conditions in the table includes nucleus production treatment conditions in the upper stage and crystal growth treatment conditions in the lower stage. For example, the case in which 750° C.-4 h is written in the upper stage and 920° C.-4 h is written in the lower stage means that the glass block was retained at 750° C. for 4 hours and then retained at 920° C. for 4 hours.

The obtained crystallized glass was processed, polished and mirror-finished. Thus, a crystallized glass sheet having a thickness t of 0.8 mm was obtained. In addition, a rod-like sample for measuring a thermal expansion coefficient was prepared. A part of the remaining crystallized glass was pulverized and used for analyzing precipitated crystals. Evaluation results of each crystallized glass are shown in Table 2. Blanks designates unevaluated items.

(Thermal Expansion Coefficient)

Based on JIS R1618:2002, an average thermal expansion coefficient (in units of $\times 10^{-7}$/° C.) at 50° C. to 350° C. was measured by use of a thermal dilatometer (TD5000SA made by Bruker AXS GmbH.). The heating rate was set at 10° C./min.

(Precipitated Crystals: Powder X-Ray Diffraction Measurement)

Powder X-ray diffraction was measured under the following conditions to identify precipitated crystals. In addition, crystallinity (in units of %) was calculated by use of a Rietveld method. Results are shown in Table 2. βSP in the table designates β-spodumene.

Measurement Apparatus: SmartLab made by Rigaku Corporation
Used X-rays: CuKα radiation
Measurement Range: 2θ=10° to 80°
Speed: 10°/min
Step: 0.02°

(Precipitated Crystals: SEM Observation)

A surface of the crystallized glass in Example 1 was etched with a 5% HF aqueous solution for 2 minutes. A backscattered electron image of the surface was observed with an observation magnification of 50,000 times by a scanning electron microscope (SEM). An average particle size was about 150 nm. FIG. 3 shows the SEM image.

(Precipitated Crystals: TEM Observation)

The crystallized glass in Example 1 was thinned into a thin piece by an ion milling method. The thin piece was observed with an observation magnification of 50,000 times by a transmission electron microscope (TEM). An average particle size (in units of nm) of precipitated crystals was obtained. FIG. 4 shows the TEM image.

(Transmittance)

An average transmittance (in units of %) of the crystallized glass sheet at a wavelength of 380 to 780 nm was measured by a spectrophotometer (LAMBDA950 made by PerkinElmer, Inc.). Results are shown in Table 2.

(Haze Value)

A haze value (in units of %) at a C illuminant was measured by a haze meter (HZ-2 made by Suga Test Instruments Co., Ltd.). Results are shown in Table 2.

(Vickers Hardness)

Vickers hardness was measured by pressing an indenter at a load of 100 gf for 15 seconds by use of a Shimadzu micro-Vickers hardness tester (HMV-2 made by Shimadzu Corporation). Incidentally, the Vickers hardness was measured in the same manner after the chemical strengthening treatment which will be described later. Results are shown in Table 2.

<Chemical Strengthening Treatment and Evaluation of Strengthened Glass>

Each glass sheet of Example 1 to Example 7, Example 9 and Example 10 was immersed in molten salt of sodium nitrate at 450° C. for 30 minutes, and then immersed in molten salt of potassium nitrate at 450° C. for 30 minutes. Thus, the glass sheet was chemically strengthened.

A stress profile for the obtained chemically strengthened glass sheet was measured.

(Stress Profile)

A stress value was measured using a surface stress meter FSM-6000 made by Orihara Manufacturing Co., LTD, and a measuring device SLP1000 made by Orihara Manufacturing Co., LTD which utilizes scattered-light photoelasticity. Thus, a compressive stress value $CS_0$ (in units of MPa) in the glass surface and a depth DOL (in units of μm) where the compressive stress value was zero were read out.

A stress profile of Example 1 is shown in FIG. 1.

TABLE 2

| | Example 1 | Example 2 | Example 3 | Example 4 | Example 5 | Example 6 | Example 7 | Example 8 | Example 9 | Example 10 |
|---|---|---|---|---|---|---|---|---|---|---|
| glass | Glass 1 | Glass 2 | Glass 3 | Glass 4 | Glass 5 | Glass 6 | Glass 7 | Glass 2 | Glass 9 | Glass 10 |
| crystallization | 750° C.-4 h | 750° C.-4 h | 750° C.-4 h | 750° C.-4 h | 750° C.-4 h | 750° C.-4 h | 750° C.-4 h | 750° C.-4 h | 750° C.-4 h | 650° C.-4 h |
| conditions | 900° C.-4 h | 900° C.-4 h | 880° C.-4 h | 900° C.-4 h | 900° C.-4 h | 880° C.-4 h | 900° C.-4 h | 880° C.-4 h | 900° C.-4 h | 900° C.-4 h |
| expansion coefficient | 12 | 13 | | | | | | | | 12 |
| Vickers hardness before strengthening (HV0.1) | 730 | 785 | 734 | 749 | 820 | 780 | 744 | | 764 | 770 |
| Vickers hardness after strengthening (HV0.1) | 820 | | 804 | 820 | 858 | 830 | 811 | | 813 | |

TABLE 2-continued

| | Example 1 | Example 2 | Example 3 | Example 4 | Example 5 | Example 6 | Example 7 | Example 8 | Example 9 | Example 10 |
|---|---|---|---|---|---|---|---|---|---|---|
| main crystal | βSP | βSP | βSP | βSP | βSP | βSP | βSP | βSP, Vir | βSP | βSP |
| crystallinity (%) | 30 | | | | | | | | | |
| average particle size of crystal | 118 | | | | | | | 70 | | |
| transmittance | 90.2 | 90.5 | 89.7 | 89.0 | 87.8 | 90.0 | 90.6 | | 87.5 | 89.2 |
| haze | 0.23 | 0.22 | 0.33 | 0.39 | 0.37 | 0.29 | 0.21 | 0.72 | 1.1 | 1.1 |
| $CS_0$ | 1200 | 1300 | 1145 | 1109 | 1080 | 1013 | 1106 | | 1157 | 1200 |
| DOL | 120 | 100 | 122 | 125 | 130 | 119 | 133 | | 117 | 105 |
| Kc | 1.2 | 1.3 | | | | | | | | |
| refractive index after crystallization | 1.5232 | 1.5231 | | 1.523 | 1.5221 | 1.5242 | 1.5229 | | 1.5241 | 1.5242 |

In comparison between Example 1 and Example 2, and Example 10, it is confirmed that Example 1 and Example 2 which were Working Examples of the present invention have a higher transmittance and a smaller haze value than Example 10 using the glass 10 which did not contain SrO and BaO.

In comparison between Example 1 and Example 9, it is confirmed that the crystallized glass containing SrO exceeding 1.8% is low in transmittance and large in haze value.

In comparison between Example 1 and Example 8, the haze value is large in spite of a small average particle size of crystals. This is because crystals whose refractive index is different from that of β-spodumene were precipitated to increase a difference in refractive index.

Although the present invention has been described in detail with reference to its specific embodiments, it is obvious for those in the art that various changes or modifications can be made without departing from the spirit and scope of the present invention. The present application is based on a Japanese patent application (Patent Application No. 2017-144868) filed on Jul. 26, 2017, a Japanese patent application (Patent Application No. 2018-002200) filed on Jan. 10, 2018, and a Japanese patent application (Patent Application No. 2018-043494) filed on Mar. 9, 2018, the contents of which are incorporated by reference.

The invention claimed is:

1. A crystallized glass, comprising, as expressed by mass % on an oxide basis:
   58 to 70% of $SiO_2$;
   15 to 30% of $Al_2O_3$;
   2 to 10% of $Li_2O$;
   0 to 5% of $Na_2O$,
   0 to 2% of $K_2O$;
   0.5% to 1.8% of SrO;
   0 to 1.5% of BaO;
   0.5 to 6% of $SnO_2$;
   0.5 to 6% of $ZrO_2$; and
   0 to 6% of $P_2O_5$,
   wherein a total content of SrO and BaO is 0.5 to 2.0%, and a total content of $Na_2O$ and $K_2O$ is 1 to 5%, and
   wherein
   the crystallized glass comprises β-spodumene crystals, wherein an average particle size of the β-spodumene crystals is 300 nm or less,
   a visible light transmittance of the crystallized glass having a thickness of 0.8 mm is 85% or higher, and
   a haze value of the crystallized glass having a thickness of 0.8 mm is 1% or lower.

2. The crystallized glass according to claim 1, wherein the haze value of the crystallized glass having a thickness of 0.8 mm is 0.6% or lower.

* * * * *